(12) United States Patent
Hartzsch

(10) Patent No.: US 8,836,269 B2
(45) Date of Patent: Sep. 16, 2014

(54) METHOD FOR DETECTING BLOCKAGES OF ELECTRICALLY COMMUTATED ELECTRIC MOTORS

(75) Inventor: Jörg Hartzsch, Dortmund (DE)

(73) Assignee: ELMOS Semiconductor AG, Dortmund (DE)

( * ) Notice: Subject to any disclaimer, the term of this patent is extended or adjusted under 35 U.S.C. 154(b) by 417 days.

(21) Appl. No.: 13/320,146

(22) PCT Filed: May 12, 2010

(86) PCT No.: PCT/EP2010/056586
§ 371 (c)(1), (2), (4) Date: Jan. 25, 2012

(87) PCT Pub. No.: WO2010/130802
PCT Pub. Date: Nov. 18, 2010

(65) Prior Publication Data
US 2012/0112682 A1    May 10, 2012

(30) Foreign Application Priority Data
May 13, 2009   (DE) .......................... 10 2009 021 205

(51) Int. Cl.
H02P 8/36    (2006.01)
H02P 6/00    (2006.01)
H02P 6/18    (2006.01)
H02P 8/08    (2006.01)

(52) U.S. Cl.
CPC ............ *H02P 6/001* (2013.01); *H02P 2209/07* (2013.01); *H02P 6/182* (2013.01); *H02P 8/08* (2013.01)
USPC ............ 318/685; 318/459; 318/484; 318/696

(58) Field of Classification Search
USPC ..................... 318/400.23, 685, 696, 459, 484
See application file for complete search history.

(56) References Cited

U.S. PATENT DOCUMENTS 4,791,343 A * 12/1988 Ahrendt ........................ 318/696
5,206,571 A *  4/1993 Burri ............................. 318/685

(Continued)

FOREIGN PATENT DOCUMENTS

| DE | 4035970 | 6/1991 |
|---|---|---|
| EP | 1460757 | 9/2001 |
| EP | 1760875 | 3/2007 |
| JP | 2000166297 | 6/2000 |

OTHER PUBLICATIONS

Siegfried Held, "Schrittantriebe", Industrie-Elektrik+ Elektronik, No. 6, 1986, pp. 58-60.

(Continued)

*Primary Examiner* — Bentsu Ro
(74) *Attorney, Agent, or Firm* — Renner, Otto, Boisselle & Sklar, LLP

(57) ABSTRACT

A method for detecting blockages of unipolar stepper motors by analyzing the motor current supply, comprising impressing a current into one or more motor windings using a controllable switch, wherein the switch selectively connects a respective motor winding connection to a supply voltage connection and wherein the connections of each motor winding lying at a common potential are permanently connected to a second supply voltage connection, wherein a current feed variant has phases between the switching of the motor windings, in which phases the motor winding connections are switched with high resistance; detecting the voltage at a motor winding connection at least for the high-resistance phase and comparing the voltage to a threshold; detecting a time interval for which the voltage is greater than the threshold; comparing interval lengths for several motor winding connections, and detecting a blockage based on the comparisons of interval lengths.

20 Claims, 4 Drawing Sheets

(56) References Cited

Figure 1:
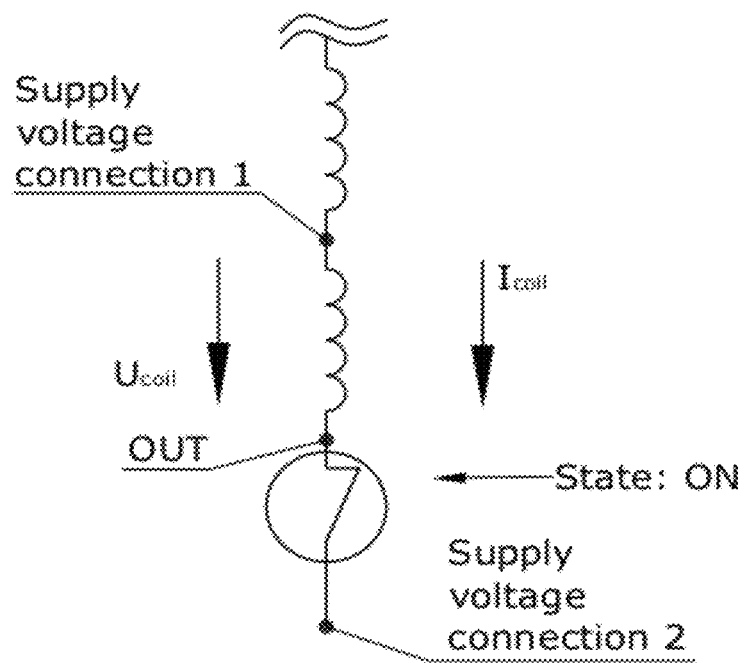

U.S. PATENT DOCUMENTS 6,285,156 B1 9/2001 Hartzsch
6,667,595 B2 * 12/2003 Wiseman ................ 318/696
6,956,343 B2 * 10/2005 Berroth et al. ......... 318/400.03

OTHER PUBLICATIONS

International Search Report for corresponding patent application No. PCT/EP2010/056586 dated Oct. 31, 2011.

* cited by examiner

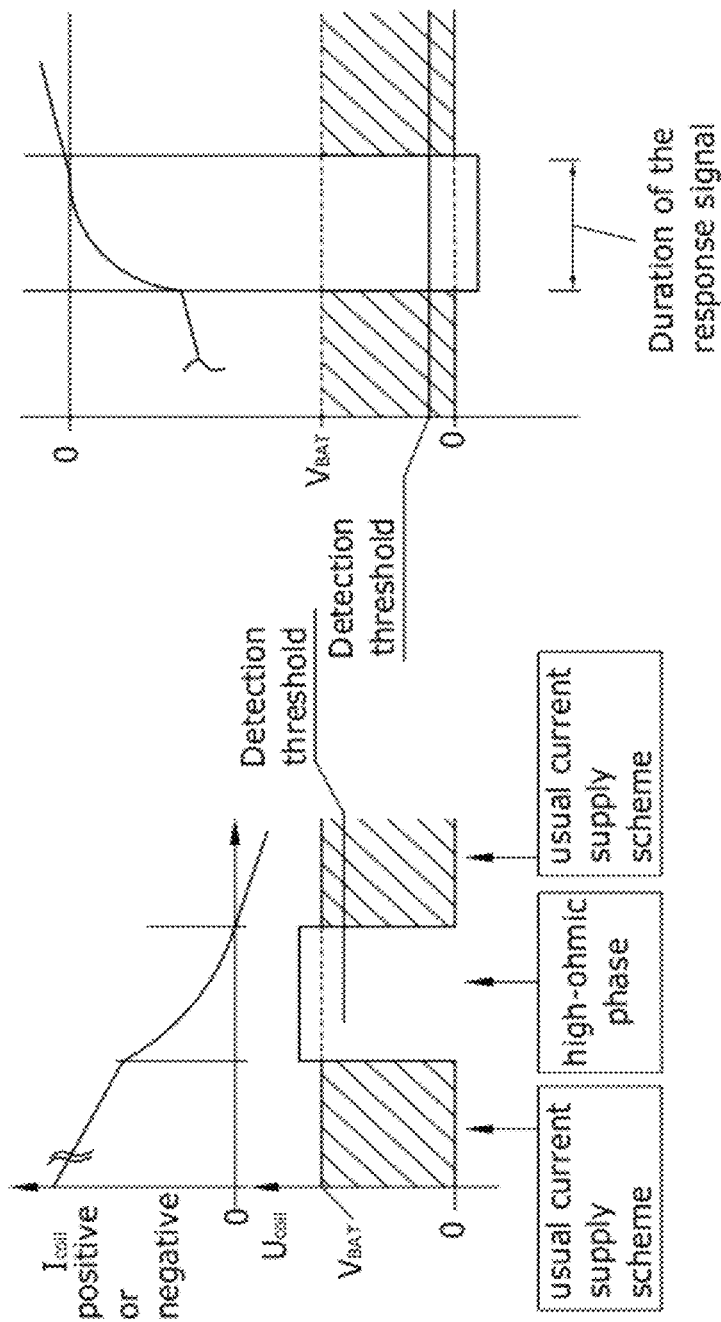

METHOD FOR DETECTING BLOCKAGES OF ELECTRICALLY COMMUTATED ELECTRIC MOTORS

The invention relates to a method for detecting blockages of electrically commutated electric motors of various types and with various numbers of windings, and in particular to stepper motors of unipolar and bipolar type as well as to 3-phase stepper motors.

According to prior art, various possibilities for determining the position of systems driven by stepper motors are known. For example, the position of the driven component can be directly detected using absolute-value position sensors. However, in most cases this version is inacceptable because the sensor leads to high material and cost expenditure.

The general embodiments and modes of operation of stepper motors are elucidated, for example, in S. Held: "Schrittantriebe" ["Stepper drives"] in: Industrie, Elektrik and Elektronik [Industry, electrics and electronics], volume 39, 1986, no. 6, pages 58-60. According to this paper one distinguishes between unipolar and bipolar motors. Further, there are 3-phase stepper motors. In the unipolar motor each phase of the stepper motor comprises two separate windings with center tapping, wherein, for operation purposes, only one part winding is excited. In the bipolar motor the phase windings do not comprise center tapping but the operating current alternately flows through them in both directions. Depending on whether current is supplied to only a single or to two excitation coils at the same time, the current supply is referred to as one- or two-line current supply. In the case of these types of current supply one distinguishes between full step and half step control with or without PWM modulation including micro stepping and sinusoidal/trapezoidal simulation or the like.

Stepper motors offer the characteristic of carrying out discrete steps, i.e. angle increments, such that the position can be simply determined by monitoring, i.e. counting, by means of an electronic counter, the number of steps carried out from a spatially defined starting point. For such position detection the following conditions must essentially be met: on the one hand, the actual starting point, which normally is a limit stop, must be recognized as a starting point of the movement, and on the other hand, it is necessary to permanently monitor whether a step has actually been carried out at each current supply to the stepper motor winding.

These two conditions can be checked by means of external sensors, for example limit switches and coding disks, which is, however, a complex and cost-intensive process. Alternatively, step detection methods which do not involve any sensors are known, wherein the feeding current or the feeding voltage is analyzed during current supply to the motor windings. Here, besides step detection, it is also possible to detect a blockage of the armature of the stepper motor and thus movement of an actuator operatively connected to said armature against a (reference) limit stop (see above).

A method and a device for sensorless movement detection of a multiphase stepper motor are known from DE 40 35 970 A1, for example. Here, the voltages of two phases, i.e. the voltages applied to the motor windings, are evaluated by means of a microcomputer. When a blockage occurs, voltage drops arise in the phase voltages, which voltage drops are recorded. Although the method is said to be insensitive to high frequency interferences, it has several other disadvantages: the movement detection is possible only on multiphase unipolar stepper motors and not on bipolar stepper motors. Further, the voltage drops can be measured only when the current source is a relatively high-impedance current source; thus normally shunt resistors must be used. This involves, of course, a considerable component input and further an unfavorable energy balance due to heat loss at the resistor.

EP 0 462 050 A1 also describes a method and a circuit for detecting the loss of synchronism of a stepper motor. The current flowing through the motor windings is tapped at a shunt resistor and evaluated. Here, like in the aforementioned publication, problems occur due to the use of the shunt resistor. Another difficulty is that current measurements are relatively fault-prone under certain operating conditions, for example when voltage fluctuations occur, as is often the case in on-board electrical systems of vehicles, which can be compensated for only by complex fault clearance and stabilization measures.

EP 0 402 220 A1 and EP 0 574 339 A2 also describe methods for step detection on stepper motors, which methods, however, also have the aforementioned drawbacks.

From DE 38 36 240 C2 it is known that a strobe pulse for estimating the rotor position angle is supplied to windings which are not excited, said strobe pulse causing a current change in the non-excited phases. By evaluating the time of current rise or drop inductance values are determined from which the momentary rotor position is extrapolated.

The application of the method mentioned last is, however, limited to multiphase reluctance motors and provides only an approximate evaluation.

Finally, from DE 196 53 460 C2 a method for sensorless step detection on stepper motors by analyzing the current supply to the motor is known, wherein during operation the various motor winding connections are switched to high impedance and the duration of the response signal at the motor winding connections switched to high impedance is evaluated to determine whether the stepper motor has moved by one step. Here, the current supply scheme is acted upon by changing said scheme for a short time by impressing a defined current into a second motor winding to which switching takes place after reversal of the current direction of the motor winding current supply of the first motor winding, and further by switching a motor winding connection of the second motor winding to high impedance.

It is an object of the invention to provide a method for detecting blockages of electrically commutated electric motors, which method can be applied to all aforementioned types or designs of electrically commutated motors.

According to a first aspect of the invention this object is achieved by a method for detecting blockages of unipolar stepper motors having one or more motor windings by analyzing the motor current supply, comprising the following method steps:

impressing an operating current according to a current supply variant for the operation of the unipolar stepper motor into the one or more motor windings thereof by means of one controllable switch per motor winding connection, wherein the switch selectively connects the respective motor winding connection to a first supply voltage connection and wherein the connections of each motor winding lying at a common potential are permanently connected to a second supply voltage connection, wherein the current supply variant has phases between the switching of the motor windings, in which phases the motor winding connections of a motor winding connected to the switches are switched to high impedance, detecting the voltage at a motor winding connection switched to high impedance at least for the high-impedance phase and comparing said voltage to a threshold that is at least 1.5 times or at least 1.8 times, in particular at least 2.0 times and preferably at least 2.5 times or at least a larger integer or non-integer multiple of the supply voltage, detecting a time interval during which the voltage at the motor winding connection switched to high impedance is larger than the threshold, comparing the lengths of the intervals for a plurality of motor winding connections each switched to high impedance, and detecting a blockage based on the comparisons of the lengths of the intervals.

According to a second aspect of the invention the aforementioned object is achieved by a method for detecting blockages of a 3-phase stepper motor by analyzing the motor current supply, comprising the following method steps:

impressing an operating current according to a current supply variant for the operation of the 3-phase stepper motor into the one or more motor windings thereof by means of a switch half bridge circuit per motor winding connection through which the motor winding connection is alternately connected to one of two of the two supply voltage connections, wherein the current supply variant has phases between the switching of the motor windings, in which phases the motor winding connection is switched to high impedance, or the current supply variant is modified such that a short time before a zero crossing of the current at a remaining residual current at a motor winding connection said motor winding connection is switched to high impedance for a specific period of time, at least, however, until the end of the time interval mentioned below, detecting the voltage at a motor winding connection switched to high impedance at least for the high-impedance phase and comparing said voltage to a threshold that, depending on the polarity of the voltage, lies near the magnitude of the voltage at one of the two supply voltage connections, detecting a time interval during which the voltage at the motor winding connection switched to high impedance is larger than the threshold, comparing the lengths of the intervals for a plurality of motor winding connections each switched to high impedance, and detecting a blockage based on the comparisons of the lengths of the intervals.

According a third aspect of the invention the aforementioned object is achieved by a method for detecting blockages of bipolar stepper motors by analyzing the motor current supply, comprising the following method steps:

impressing an operating current according to a current supply variant for the operation of the bipolar stepper motor into the one or more motor windings thereof by means of a switch half bridge circuit per motor winding connection through which the motor winding connection is alternately connected to one of two supply voltage connections, detecting the polarity of the voltage drop across a switch and detecting the point of time of the polarity reversal as an indication of a reversal of the current direction in the switch, determining the time difference interval between the point of time of the beginning of a motor commutation control and the point of time of the polarity reversal of the voltage drop across the switch, comparing the lengths of the intervals for a plurality of motor winding connections each switched to high impedance, and detecting a blockage based on the comparisons of the lengths of the intervals.

According a fourth aspect of the invention the aforementioned object is achieved by a method for detecting blockages of bipolar stepper motors by analyzing the motor current supply, comprising the following method steps:

impressing an operating current according to a current supply variant for the operation of the bipolar stepper motor into the one or more motor windings thereof by means of a switch half bridge circuit per motor winding connection through which the motor winding connection is alternately connected to one of two supply voltage connections, switching to high impedance a motor winding connection connected to the supply connection carrying the higher potential for a specific period of time, at least, however, until the end of the time interval mentioned below, and switching the motor winding connection controlled in phase opposition from the supply connection carrying the lower potential to the supply connection carrying the higher potential, detecting the voltage at a motor winding connection switched to high impedance at least for the high-impedance phase and comparing said voltage to a threshold that lies near, i.e. is equal to or essentially equal to, the magnitude of the voltage of the supply connection carrying the lower potential, detecting a time interval during which the voltage at the motor winding connection switched to high impedance is larger than the threshold, comparing the lengths of the intervals for a plurality of motor winding connections each switched to high impedance, and detecting a blockage based on the comparisons of the lengths of the intervals.

The particular feature of the invention is that the current supply scheme and the signal detection are adapted to all three aforementioned stepper motor types. This allows the method for detecting blockages according to the invention to be also applied to unipolar stepper motors, 3-phase stepper motors and bipolar stepper motors comprising other types of current supply than that described in DE 196 53 460 C2. Further, the method according to the invention can be applied to all motor types even with PWM current supply in order to allow, inter alia, the use of torque adaptation (depending on the supply voltage, for example) or a micro stepping method.

Further features of the invention and the advantages thereof can be summarized as follows:

In contrast to other solutions available in the market the concept can be implemented, with regard to the circuitry, in a space-saving manner on an IC since it is largely realized in a digital (i.e. "shrinkable") manner.

It requires neither an ADC nor a controller, but if these components are available in the IC or the system they can be used.

The evaluation can fully or partly be carried out through a software instead of a discrete logic.

In contrast to other solutions available in the market the concept according to the invention is very tolerant towards ambient and motor parameters.

In contrast to other solutions available in the market the concept according to the invention offers considerably more reliable characteristics.

Further, according to various embodiments of the invention, one or a plurality of the features stated below are provided, namely a) Motor Types a.1)—the realization for x-phase, in particular 2-phase unipolar stepper motors is carried out for common node=neg. supply,
common node=pos. supply, common node of a coil pair to neg. supply of the other coil pair to pos. supply, (Thus for unipolar motors and for bipolar motors the same control circuit can be used, wherein this type of control can also be carried out without detection of blockages in all current supply types)

with 1-line block current supply with and without PWM,
with 2-line block current supply with and without PWM,
half step process with and without PWM, with micro stepping with PWM (sine, trapezoid, other waveforms),
with micro stepping with PWM (with torque and/or speed control);

a.2)—the realization for x-phase, in particular 3-phase motors is carried out with star circuit,
delta circuit (with and without virtual star point),
all current supply types with:
block commutation,
micro stepping with PWM (sine, trapezoid, other waveforms), micro stepping with PWM (in particular for space vector modulation),
micro stepping with PWM with torque and/or speed control independent of the type of modulation (see above);

b) Reference Generation b.1)—the supply (positive, negative, GND) or other reference voltages serve as comparator reference potential(s) or as a basis for generating the reference potentials,
optionally measurement and reference potentials are divided down;

b.2)—optionally the detection of voltage drops is carried out via drivers by means of capacitive coupling; and optionally a capacitive voltage division is carried out;

b.3)—the reference potential corresponds to x times the supply potential;

b.4) in particular in such a way that x is essentially selected as 2;

b.5) in particular in such a way that a positive or a negative offset is added to the basic reference;

b.6)—the reference generation is adapted to be dynamically changed over during operation depending on ambient parameters (such as operating voltage, temperature, motor situation);

c) Preamplification c.1)—optionally the signal is preamplified (normally analogously);

c.2)—the preamplification is designed in analogous technique, or
the preamplification is designed in SC technique;

d) Comparator d.1)—the comparator is designed in analogous technique, or d.2)—the comparator is designed in SC technique;

d.3)—the preamplification and the comparator are realized in a common SC technique;

d.4)—the comparator is created by means of a single transistor against a basic load, wherein the voltage error is accepted by the transistor threshold voltage, in particular utilizing existing structures modified for this purpose, for the purpose of protecting components against ESD;

d.5)—in accordance with d.4) but with a circuit for compensating for the voltage error;

e) Clamping Structure e.1)—when the reference is reached the measuring signal is clamped at this threshold;

e.2)—when the reference is reached the measuring signal is not clamped;

e.3)—the type of clamping function is also adapted to be dynamically changed over during operation;

e.4)—the voltage limitation (clamping) is realized by one or a plurality of diodes and/or other semiconductors;

e.5)—the voltage limitation is realized such that first a voltage detection is carried out using the components described above under 38), which, as a result, activates a power driver that carries a large portion of the current load;

e.6)—the power driver designed for clamping purposes is a driver provided for motor control;

e.7)—the power driver is specifically implemented for this purpose;

e.8)—the power driver is a component provided for protecting the assembly (e.g. ESD protection transistor);

e.9)—the current flow through these components is monitored;

e.10)—merely the current flow at one of these components is monitored;

e.11)—for voltage monitoring at one or a plurality of components an additional load (current source or resistor) is connected to these components, which load, in an inactive case (voltage limitation not activated), ensures a defined signal level;

f) Variant With Time Counter (Assembly: Time Counter)

f.1)—the length of the comparator signal is determined by a time counter;

f.2)—the counter is designed of logic gates;

f.3)—a TMU (time measurement unit) is used for counting;

f.4)—a controller/processor directly carries out the time counting;

f.5)—the counter operates logarithmically, i.e. counts more slowly with increasing counting time (to considerably reduce the counter size and simplify the subsequent evaluation);

f.6)—the logarithmization is carried out in rough steps (adapted to the application) and thus may contain errors in a controlled manner to keep the production costs as low as possible;

g) Variant With Time Counter (Assembly: Evaluation and Filter)

g.1)—a logic evaluates and/or filters the time countings;

g.2)—a controller/processor evaluates and/or filters the time countings;

g.3)—the evaluation and/or filtering are carried out through a software;

g.4) the software can be reprogrammed in the system (e.g. by means of FLASH);

h) Variant With Direct Conversion by ADC h.1)—the voltages are digitalized without a comparator by means of ADC with or without preamplification;

h.2)—the ADC is evaluated through a logic;

h.3)—the ADC is evaluated by a controller or a processor;

h.4)—the evaluation is carried out through a software;

h.5)—the software can be reprogrammed (e.g. by means of FLASH) to allow for adaptation to various motor types;

i) Determination of the Motor Load
i.1)—the time of the current supply phase determined as illustrated cannot only be used for analyzing the blockages of a motor but also for determining the present motor load 38);
the knowledge of the load is used to adapt the current supply of the motor to the required degree by means of PM influence (to reduce: current consumption, interferences, temperature) or to increase it (to prevent step losses and/or blockages);
i.2)—the knowledge of the load is used to reach a maximum torque and maximum dynamics when the motor is accelerated and braked;
i.3)—the knowledge of the load is used to reduce the torque of the motor purposefully and according to requirement in specific operating situations;
i.4)—the knowledge of the load is used to compensate for the dependence of the torque of the motor on the supply voltage;
i.5)—the knowledge of the load is used to compensate for the dependence of the torque of the motor on the temperature.

In an advantageous further embodiment of the invention it is provided that alternating variations of the length of the time intervals by more than a predeterminable difference are to be considered a first indication of a possible blockage.

In another advantageous embodiment of the invention it is provided that the results of the evaluation of the lengths of the time intervals are filtered to suppress the influence of interferences.

In an advantageous embodiment of the invention it is provided that the present rotational position of the stepper motor and/or the armature thereof is determined at the point of time when the blockage is detected, and/or that the current supply of the stepper motor is stopped when a blockage is detected to reduce generation of noise and/or to minimize a mechanical overload of the stepper motor, a gearbox operatively connected to said motor and/or other components.

In another advantageous embodiment of the invention it is provided that the transition from the current supply of a motor winding to the current supply of the countercurrent motor winding is not carried out simultaneously but with a predeterminable timing, in particular in the case of a PWM sinusoidal/trapezoidal etc. commutation with a predeterminable timing related to the zero crossing, and that in particular at a specific time before the zero crossing at a remaining residual current the waveform, deviating from the waveform characterizing the current supply variant, is interrupted and the motor winding connection is switched to high impedance (similar to FIG. 5).

In an advantageous embodiment of the invention it is provided that for detecting the response signals a peak detector determines the peak of the response signal and the comparison for determining the end of the response signal is carried out using a threshold which depends on the peak voltage of the peak detector and in particular shows a specific division ratio to said voltage.

Figure 3:
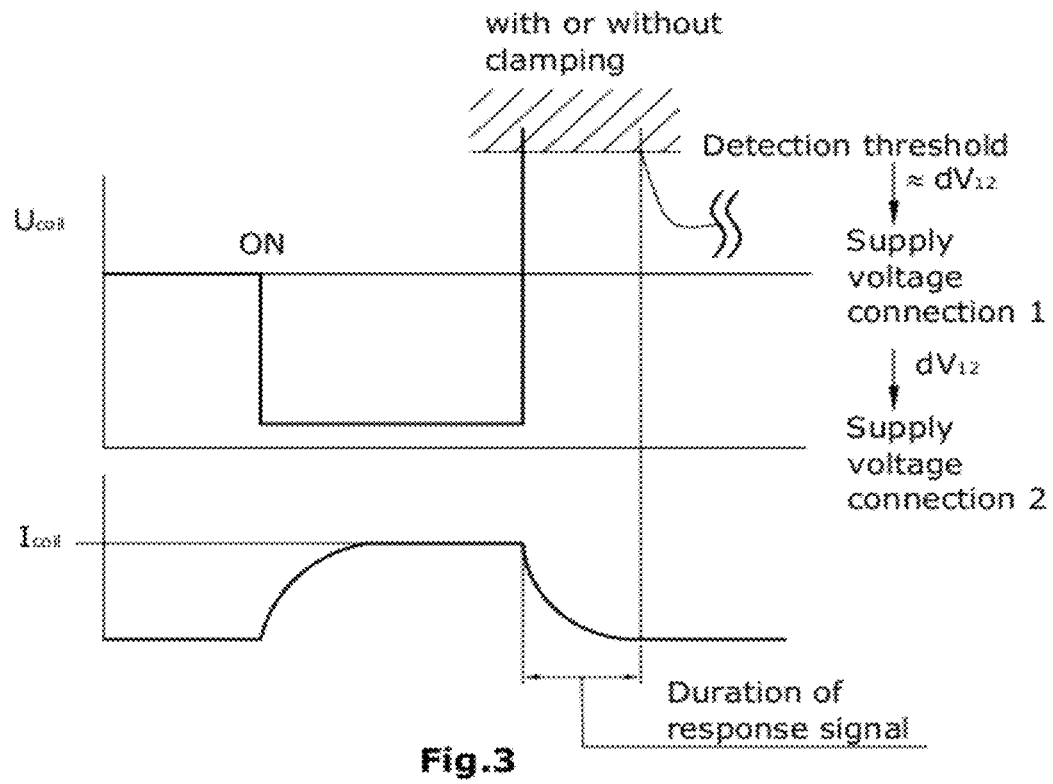

In another advantageous embodiment of the invention it is provided that, upon detection of the response signal when the threshold is reached, the response signal is clamped and thus the current supplied back is discharged against the supply voltage against which the switches switch in the on-state (FIG. 3, see note "with and without clamping").

In an advantageous embodiment of the invention it is provided that for detection of the response signals the threshold and, in particular in the case of unipolar stepper motors, the clamping characteristic during operation, if necessary, is/are connected such that it/they is/are adapted to be dynamically changed over depending on parameters (such as the operating voltage, the temperature and the motor situation, for example).

In another advantageous embodiment of the invention it is provided that for the purpose of cost-saving implementation the determination of the duration of the time intervals is carried out by means of a logarithmic and thus shorter counter, wherein the subsequent mathematical operations can be carried out via cost-saving addition/subtraction (plus/minus calculation) instead of multiplied by/divided by calculation (multiplication/division).

In an advantageous embodiment of the invention it is provided that the detection of the response signal is carried out by an ADC, wherein the tasks of the threshold value generation as well as the determination of the duration of the response signal, the difference generations as well as filter functions can be fully or partly carried out through a logic and/or with the aid of a controller through a software.

In another advantageous embodiment of the invention it is provided
  that, when deviations occur for the first time, the momentary position values (as steps and angles or the like) are buffered (FIG. 4),
  that during later detection of a blockage or another load condition this buffered value is used to compensate for or to minimize the position error caused by the response delay of the filter (FIG. 4),
  that during later detection of a blockage or another load condition optionally a fixed or a variable correction value is added to the buffered momentary position value or subtracted from said value to minimize remaining residual errors of the process, and
  that during later non-detection of a blockage the buffered values are discarded.

In an advantageous embodiment of the invention it is provided that the measurement of the duration of the time intervals starts either at the beginning of switching to high impedance or at the time of detection of the beginning of the time interval, depending on the operating condition.

In another advantageous embodiment of the invention it is provided that 3-phase stepper motors are used, characterized by
  omission of switching to high impedance of a winding connection,
  monitoring of the polarity of the voltage drop (similar to FIG. 7) across the switches and determination of the point of time of the polarity reversal,
  determination of the duration of the difference time interval by determining the time difference between the motor commutations and the points of time of the polarity reversal, and
  evaluation as described in the claims above.

Figure 2:
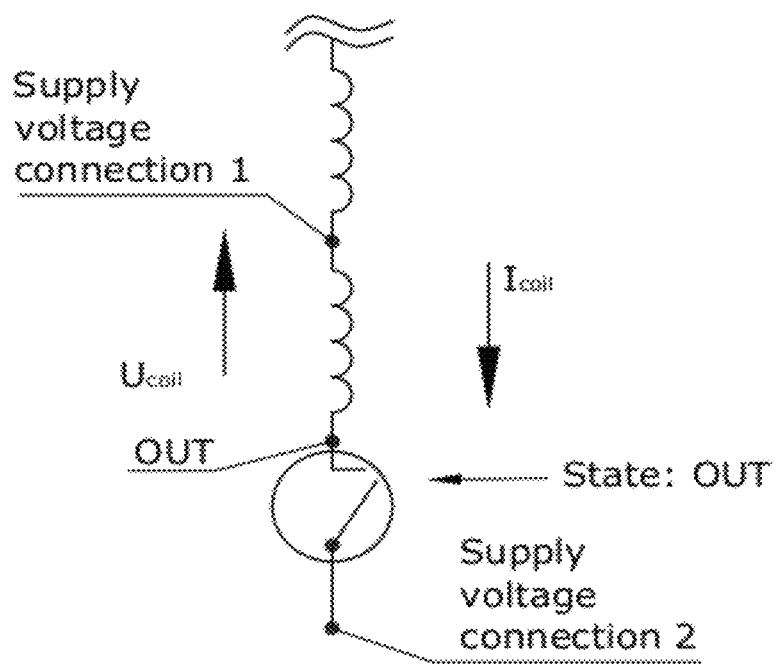
Figure 4:
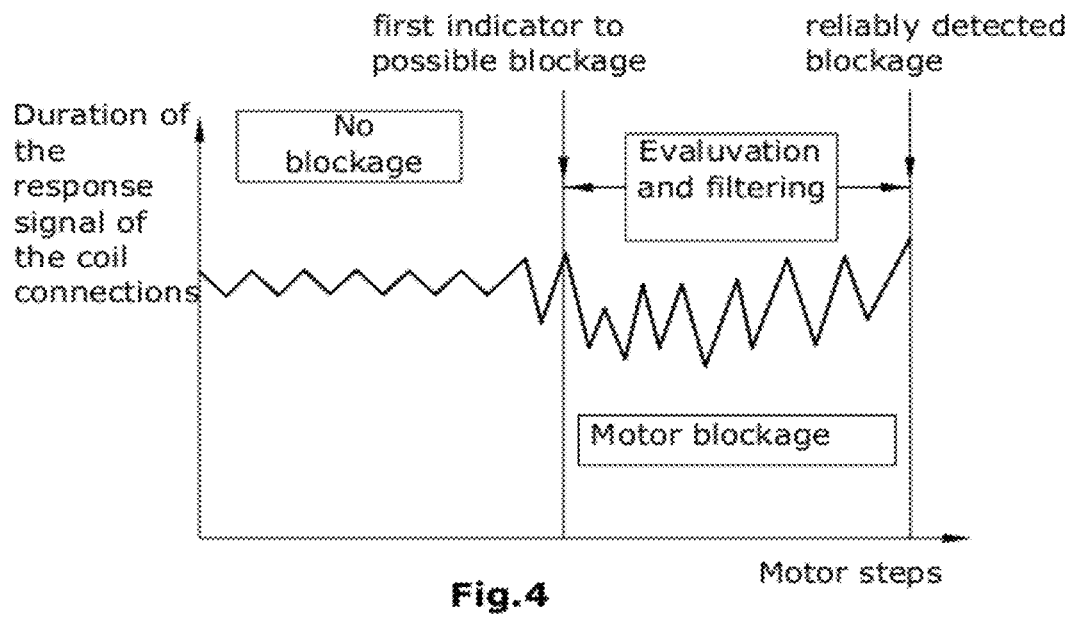
Figure 7:
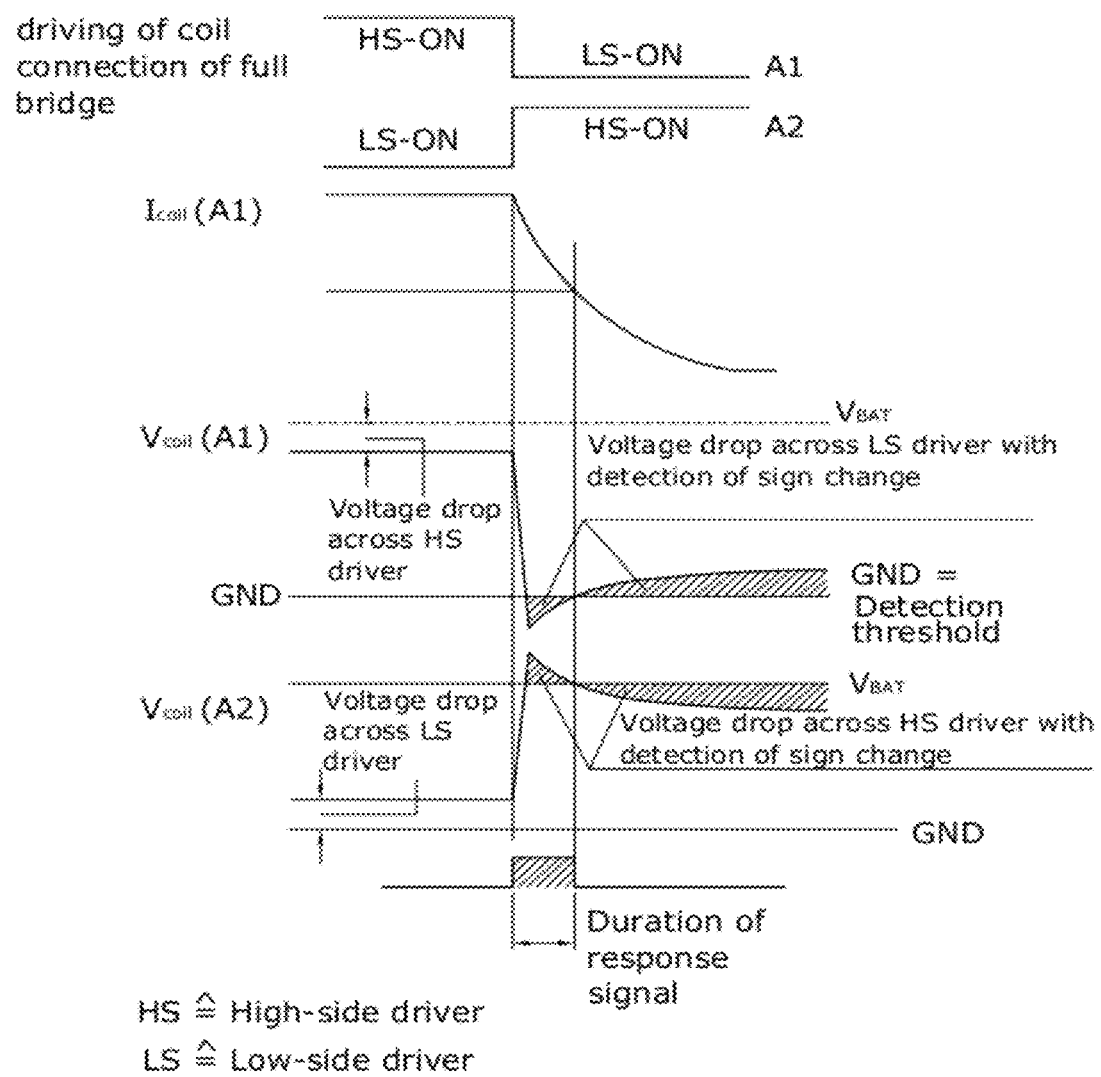

Hereunder the invention is described in detail on the basis of several embodiments and with reference to the drawing in which:

FIGS. 1 to 3 show schematic representations and signal waveforms for elucidating the method for detecting blockages using the example of a unipolar stepper motor, FIG. 4 shows a schematic representation of the (response) signal waveform on the basis of which a blockage can be detected independent of the motor type, FIGS. 5 and 6 show schematic representations and signal waveforms for elucidating the method for detecting blockages of a 3-phase stepper motor, and FIG. 7 shows schematic representations and signal waveforms for elucidating the method for detecting blockages of a bipolar stepper motor.

DESCRIPTION OF A VARIANT OF THE INVENTION USED FOR A UNIPOLAR MOTOR

For detection of a blockage of a unipolar motor the winding current is monitored during the commutation phase according to the invention. FIGS. 1 and 2 show the conditions in the two time segments of a current commutation.

FIG. 1 shows that a low-side switch of a winding pair (here an example comprising center tapping) of a unipolar motor drives a current from one supply voltage connection 1 (here exemplified by VBAT) to another supply voltage connection 2 (here exemplified by GND) through the winding.

The evaluation phase of the process starts in the second time segment (see FIG. 2) when the switch and/or the transistor which switches the winding connection against the supply voltage connection 2 (here exemplified by GND) is switched off.

In this phase the winding current remains constant at first due to the inductance of the motor winding. As a result, the voltage at the winding connection (here OUT) does not only jump up to the potential of the supply voltage connection 1 (here exemplified by VBAT) but beyond said potential. The final value of the voltage of the winding connection (here OUT) depends on the amount of the current which flowed before through the winding and on the rotational movement of the motor, but is additionally limited by other conditions of the system, e.g. clamping conditions due to optional Zener diodes. Normally, however, the overshoot reaches a magnitude of at least the voltage difference between the supply voltage connection 1 (here exemplified by VBAT) and the other supply voltage connection 2 (here exemplified by GND).

Since the voltage drop across the inductor and/or the motor winding adopts an opposite sign when the second time segment is reached, the winding current starts to decrease. FIGS. 3 and 4 show simplified time diagrams (voltage and current curves) during the commutation process.

As soon as the winding current has disappeared (0 amperes) the voltage at OUT tends to the direction of the supply voltage connection 1 (here exemplified by VBAT).

This state is detected by observing the voltage at OUT and determining the duration during which the voltage at OUT is equal to or at least equal to a reference voltage, normally approximately 2 times the voltage at the supply voltage connection 1.

The accuracy of the threshold is relatively insignificant. It should, however, not be too far below 2 times VBAT and/or 2 times the voltage at the supply connection 1 since below that value lie the feedback voltages of the open winding connection due to the generator effect of the motors.

If the threshold resided in this range the generator effect would superimpose the detection of I=0A and thus the process would be relatively unreliable. The duration of the feedback is transmitted to an evaluation unit. To allow detection of a blockage the evaluation unit must evaluate the change of these periods.

A free running motor, i.e. a motor which is not blocked, generates comparably constant values for the time spans during which the voltage at OUT is equal to or at least equal to a reference voltage, normally 2 times the voltage at the supply voltage connection 1. As soon as the motor is blocked, the sequence of periods shows a significant change (see FIG. 4) since the motor windings are affected by the blocking conditions.

Thresholds, continuous measurements and evaluations can be realized using comparators plus digital technology, including microcontrollers and software, however, it is also possible to detect the voltages of the winding connections with an ADC and to realize thresholds, continuous measurements and evaluations using digital technology and/or microcontrollers and software.

FIGS. 5 and 6 show schematic representations of the signal waveforms when the method according to the invention is applied to a 3-phase stepper motor, as is the subject matter of claim 2. FIG. 6 also relates to the subject matter described in claim 4.

Finally, the signal waveforms shown in FIG. 7 illustrate the application of the method according to the invention to a bipolar stepper motor according to claim 3 and according to claim 16.

The invention claimed is:

1. A method for detecting blockages of unipolar stepper motors having one or more motor windings by analyzing the motor current supply, comprising the following method steps:
    impressing an operating current according to a current supply variant for the operation of the unipolar stepper motor into the one or more motor windings thereof by means of one controllable switch per motor winding connection, wherein the switch selectively connects the respective motor winding connection to a first supply voltage connection and wherein the connections of each motor winding lying at a common potential are permanently connected to a second supply voltage connection,
    wherein the current supply variant has phases between the switching of the motor windings, in which phases the motor winding connections of a motor winding connected to the switches are switched to high impedance,
    detecting the voltage at a motor winding connection switched to high impedance at least for the high-impedance phase and comparing said voltage to a threshold that is at least 1.5 times the supply voltage,
    detecting a time interval during which the voltage at the motor winding connection switched to high impedance is larger than the threshold,
    comparing the lengths of the intervals for a plurality of motor winding connections each switched to high impedance, and
    detecting a blockage based on the comparisons of the lengths of the intervals.

2. The method according to claim 1, applicable to all aforementioned stepper motor types, characterized in that in the case of alternating variations of the lengths of the time intervals by more than a predeterminable difference a (first) indication of a possible blockage is detected.

3. The method according to claim 1, applicable to all stepper motor types, characterized in that the results of the evaluation of the lengths of the time intervals are filtered to suppress the influence of interferences.

4. The method according to claim 1, applicable to all aforementioned stepper motor types, characterized in that the present rotational position of the stepper motor and/or the armature thereof is determined at the point of time when the blockage is detected, and/or that the current supply of the stepper motor is stopped when a blockage is detected to reduce generation of noise and/or to minimize a mechanical overload of the stepper motor, a gearbox operatively connected to said motor and/or other components.

5. The method according to claim 1, applicable to all aforementioned stepper motor types, characterized in that the transition from the current supply of a motor winding to the current supply of the countercurrent motor winding is not carried out simultaneously but with a predeterminable timing, and that at a specific time before the zero crossing at a remaining residual current the waveform, deviating from the waveform characterizing the current supply variant, is interrupted and the motor winding connection is switched to high impedance.

6. The method according to claim 1, applicable to all aforementioned stepper motor types, characterized in that for detecting the response signals a peak detector determines the peak of the response signal and the comparison for determining the end of the response signal is carried out using a threshold which depends on the peak voltage of the peak detector.

7. The method according to claim 1, applicable to unipolar stepper motors, characterized in that, upon detection of the response signal when the threshold is reached, the response signal is clamped and thus the current supplied back is discharged against the supply voltage against which the switches switch in the on-state.

8. The method according to claim 1, applicable to all aforementioned stepper motor types, characterized in that for detection of the response signals the threshold and/or the clamping characteristic during operation, if necessary, is/are connected such that it/they is/are adapted to be dynamically changed over depending on parameters.

9. The method according to claim 1, applicable to all aforementioned stepper motor types, characterized in that for the purpose of cost-saving implementation the determination of the duration of the time intervals is carried out by means of a logarithmic and thus shorter counter, wherein the subsequent mathematical operations can be carried out via cost-saving addition/subtraction instead of multiplied by/divided by calculation.

10. The method according to claim 1, applicable to all aforementioned stepper motor types, characterized in that the detection of the response signal is carried out by an ADC, wherein the tasks of threshold value generation as well as the determination of the duration of the response signal, the difference generations as well as filter functions can be fully or partly carried out through a logic and/or with the aid of a controller through a software.

11. The method according to claim 1, applicable to all aforementioned stepper motor types, characterized in
that, when deviations occur for the first time, the momentary position values are buffered,
that during later detection of a blockage or another load condition this buffered value is used to compensate for or to minimize the position error caused by the response delay of the filter,
that during later detection of a blockage or another load condition optionally a fixed or a variable correction value is added to the buffered momentary position value or subtracted from said value to minimize remaining residual errors of the process, and
that during later non-detection of a blockage the buffered values are discarded.

12. The method according to claim 1, applicable to all aforementioned stepper motor types, characterized in that the measurement of the duration of the time intervals starts either at the beginning of switching to high impedance or at the time of detection of the beginning of the time interval, depending on the operating condition.

13. Application of the method according to claim 1 for time optimizing initialization processes of the stepper motor and/or a unit provided with said stepper motor, comprising moving the stepper motor shaft or an actuator operatively connected to said motor against a limit stop, and/or for using the detected time intervals for influencing the stepper motor control, in particular with regard to motor speed and/or torque.

14. The method according to claim 1, wherein the voltage is compared to a threshold that is at least 1.8 times the supply voltage.

15. The method according to claim 1, wherein the voltage is compared to a threshold that is at least 2.0 times the supply voltage.

16. The method according to claim 1, wherein the voltage is compared to a threshold that is at least 2.5 times the supply voltage.

17. A method for detecting blockages of a 3-phase stepper motor by analyzing the motor current supply, comprising the following method steps:
impressing an operating current according to a current supply variant for the operation of the 3-phase stepper motor into the one or more motor windings thereof by means of a switch half bridge circuit per motor winding connection through which the motor winding connection is alternately connected to one of two of the two supply voltage connections,
wherein
the current supply variant has phases between the switching of the motor windings, in which phases the motor winding connection is switched to high impedance,
or
the current supply variant is modified such that a short time before a zero crossing of the current at a remaining residual current at a motor winding connection said motor winding connection is switched to high impedance for a specific period of time, at least, however, until the end of the time interval mentioned below,
detecting the voltage at a motor winding connection switched to high impedance at least for the high-impedance phase and comparing said voltage to a threshold that, depending on the polarity of the voltage, lies near the magnitude of the voltage at one of the two supply voltage connections,
detecting a time interval during which the voltage at the motor winding connection switched to high impedance is larger than the threshold,
comparing the lengths of the intervals for a plurality of motor winding connections each switched to high impedance, and
detecting a blockage based on the comparisons of the lengths of the intervals.

18. The method according to claim 17, applicable to 3-phase stepper motors, characterized by
omission of switching to high impedance of a winding connection,
monitoring of the polarity of the voltage drop across the switches and determination of the point of time of the polarity reversal,
determination of the duration of the difference time interval by determining the time difference between the motor commutations and the points of time of the polarity reversal.

19. A method for detecting blockages of bipolar stepper motors by analyzing the motor current supply, comprising the following steps:

impressing an operating current according to a current supply variant for the operation of the bipolar stepper motor into the one or more motor windings thereof by means of a switch half bridge circuit per motor winding connection through which the motor winding connection is alternately connected to one of two supply voltage connections, detecting the polarity of the voltage drop across a switch and detecting the point of time of the polarity reversal as an indication of a reversal of the current direction in the switch, determining the time difference interval between the point of time of the beginning of a motor commutation control and the point of time of the polarity reversal of the voltage drop across the switch, comparing the lengths of the intervals for a plurality of motor winding connections each switched to high impedance, and detecting a blockage based on the comparisons of the lengths of the intervals.

20. A method for detecting blockages of bipolar stepper motors by analyzing the motor current supply, comprising the following steps:

impressing an operating current according to a current supply variant for the operation of the bipolar stepper motor into the one or more motor windings thereof by means of a switch half bridge circuit per motor winding connection through which the motor winding connection is alternately connected to one of two supply voltage connections, switching to high impedance a motor winding connection connected to the supply connection carrying the higher potential for a specific period of time, at least, however, until the end of the time interval mentioned below, and switching the motor winding connection controlled in phase opposition from the supply connection carrying the lower potential to the supply connection carrying the higher potential, detecting the voltage at a motor winding connection switched to high impedance at least for the high-impedance phase and comparing said voltage to a threshold that lies near the magnitude of the voltage of the supply connection carrying the lower potential, detecting a time interval during which the voltage at the motor winding connection switched to high impedance is larger than the threshold, comparing the lengths of the intervals for a plurality of motor winding connections each switched to high impedance, and detecting a blockage based on the comparisons of the lengths of the intervals.

\* \* \* \* \*